United States Patent [19]
Gupta et al.

[11] Patent Number: 5,161,191
[45] Date of Patent: Nov. 3, 1992

[54] ENCRYPTION SYSTEM FOR TIME DIVISION MULTIPLEXED NETWORKS

[76] Inventors: Shanti S. Gupta, 100 Manette Ct., Gaithersburg, Md. 20878; Darryl C. Morris, 1209 Summerfield Dr., Herndon, Va. 22070

[21] Appl. No.: 618,617

[22] Filed: Nov. 27, 1990

[51] Int. Cl.⁵ .................................. H04K 1/04
[52] U.S. Cl. .......................... 380/37; 380/36; 380/49; 370/58.2
[58] Field of Search .............. 380/42, 48, 49, 50, 380/36, 37; 370/58.2, 60, 60.1, 68, 68.1, 99, 102

[56] References Cited
U.S. PATENT DOCUMENTS

| | | | |
|---|---|---|---|
| 4,479,142 | 10/1984 | Buschman et al. | 370/99 X |
| 4,719,624 | 1/1988 | Bellisio | 370/105.1 |
| 4,866,773 | 9/1989 | Lubarsky | 380/48 |
| 4,868,831 | 9/1989 | Gorshe | 370/99 X |
| 5,003,599 | 3/1991 | Landry | 380/48 |

*Primary Examiner*—Tod R. Swann
*Attorney, Agent, or Firm*—Larson & Taylor

[57] ABSTRACT

An encryption system is provided for interfacing a time division multiplexing (TDM) telecommunications arrangement with an encryption device for the scrambling of data received by the telecommunications arrangement. The telecommunications arrangement produces a TDM data stream formatted into TDM frames including a predetermined number of TDM framing bits and corresponding framing bit locations. At a local side of the system, a first TDM data stream is received and sampled, and the TDM framing bit information is detected and stored therefrom. The data stream is then sent to an encryptor for encryption, and thereafter the TDM framing bit information is reinserted into the corresponding bit locations of the encrypted data stream. As a result, the TDM framing bit information is passed around the encryptor. This encrypted data stream and framing bit information is transmitted to a remote station across a TDM (e.g., T1) communications network. At the remote station, the TDM framing bit information is again detected and stored, the encrypted data stream is decrypted, and the TDM framing bit information is reinserted to the corresponding locations.

16 Claims, 2 Drawing Sheets

ENCRYPTION SYSTEM FOR TIME DIVISION MULTIPLEXED NETWORKS

FIELD OF THE INVENTION

This invention relates generally to data encryption systems and, more specifically, to a data encryption system which enables interfacing with time division multiplexed networks.

BACKGROUND OF THE INVENTION

The increasing prevalence of digital communications systems has led to the widespread use of digital encryption by governments and other entities concerned with maintaining the security of sensitive data.

Generally speaking, an encryption system includes an encryption device that scrambles the value of each bit location in a data stream with respect to a particular encryption key or code. This has the effect of rendering the data stream unintelligible. A corresponding decryption device unscrambles the encrypted data stream by using a key that matches to the original key of the encrypting device. An example of a popularly used encryption device is the KG 81/94 family of key generators (KGs).

Unfortunately, such an encryption technique if applied alone to all data bits in a data stream prevents the use of widely popular and highly cost effective time division multiplexing (TDM) systems such as the T1 and T3 systems over many transmission networks. In a T1 system, 8 bit words from 24 channels, sampled at 8kHz, are multiplexed together to form the first 192 bits of a T1 frame. The 193rd bit in each frame is a T1 framing bit which is used to identify the end of the current frame and beginning of the subsequent frame in the bit stream. This approach requires that the T1 frames must be transmitted at 1.544 Mhz. The framing bits are utilized at a T1 receiver to define the end of the T1 frames and to provide for proper demultiplexing of channels within the frame. If the T1 formatted data were to be scrambled by an encryption device such as the one described above, then the T1 framing bit would also be encrypted. Thus the information contained in the framing bits would be unable to be utilized by a intermediate transmission network for frame synchronization and timing, and, as a consequence, could not be transmitted over such a T1 network.

One method for alleviating the problem discussed above is to use dedicated lines between communications sites rather than a shared transmission network as dedicated lines do not require intermediate synchronization. This approach suffers the disadvantage of decreasing the flexibility and increasing the cost of the overall communications system.

Another method of encrypting a T1 system is to sacrifice some of the usable bandwidth to provide additional room for some of the overhead functions such as additional (unencrypted) frame bits. This can be done by either reducing the number of available channels from 24 to 23 or by reducing bandwith of the 24 channels from 64 Kbps to 56 Kbps. This method of encrypting reduces the utility of T1 communications in sending video information and also increases the format sensitivity. With the bandwidth reduced to 56 Kbps, the T1 lines are not compatible with the integrated services digital network (ISDN) standards, since ISDN requires 64 Kbps bearer channels.

One prior art device or system for providing for encryption in a T1 communications system is disclosed in U.S. Pat. No. 4,866,773 (Lubarsky). The Lubarsky device provides for the removal of TDM framing bit information and the reinsertion of this information in a different location in the TDM bit stream. This method of relocating the TDM framing bit information is only effective with the particular type of encryption used in the Lubarsky device and would be ineffective with the type of encryption described above.

SUMMARY OF THE INVENTION

In accordance with the invention, an encryption system is provided which enables interfacing of a time division multiplexing (TDM) telecommunications arrangement with an encryption device for the scrambling of data received by the telecommunications arrangement so as to overcome the problems of encrypting a T1 communications network discussed above.

According to a preferred embodiment of the invention, the telecommunications system or arrangement produces a TDM data stream formatted into TDM frames including a predetermined number of TDM framing bits and corresponding framing bit locations. The telecommunications arrangement has two sides, a local side and a remote side. At the local side, a first TDM data stream is received by the telecommunications arrangement, the data stream is sampled and the unencrypted TDM framing bit information is detected and stored. The first data stream is then sent to an encryption device which provides encryption. The unencrypted TDM framing bit information is then reinserted into the corresponding bit locations of the encrypted data stream, so that the unencrypted TDM framing bit information is passed around the encryption device. The telecommunications arrangement then transmits the encrypted data stream and framing bit information to a remote station across a T1 or like communications network. At the remote side of the encryption system, the transmitted encrypted data stream is received, and the unencrypted TDM framing bit information is again detected and stored therefrom. The encrypted data stream is then decrypted, and the unencrypted TDM framing bit information is reinserted in the corresponding locations.

By providing for a pass around of the unencrypted TDM framing bit information, the T1 network can be used to send encrypted information, thus reducing the cost of connectivity and increasing throughput. The end user is not affected by this encryption approach since the passing around of the unencrypted TDM framing bit information will be transparent to the end user.

The system of the invention enables T1 and other TDM lines to be used with classified or sensitive information over T1 or like groups communicating over leased facilities or shared commercial transmission networks. The system provides a 64 Kbps clear channel capability and ISDN compatibility. The system also enables the cryptographic protection of classified T1 groups passing through unclassified or lesser classification digital cross connects systems (DCCS).

Other features and advantages of the invention will be set forth in, or apparent from, the following detailed description of preferred embodiments of the invention.

DESCRIPTION OF THE PREFERRED EMBODIMENTS

Figure 1:
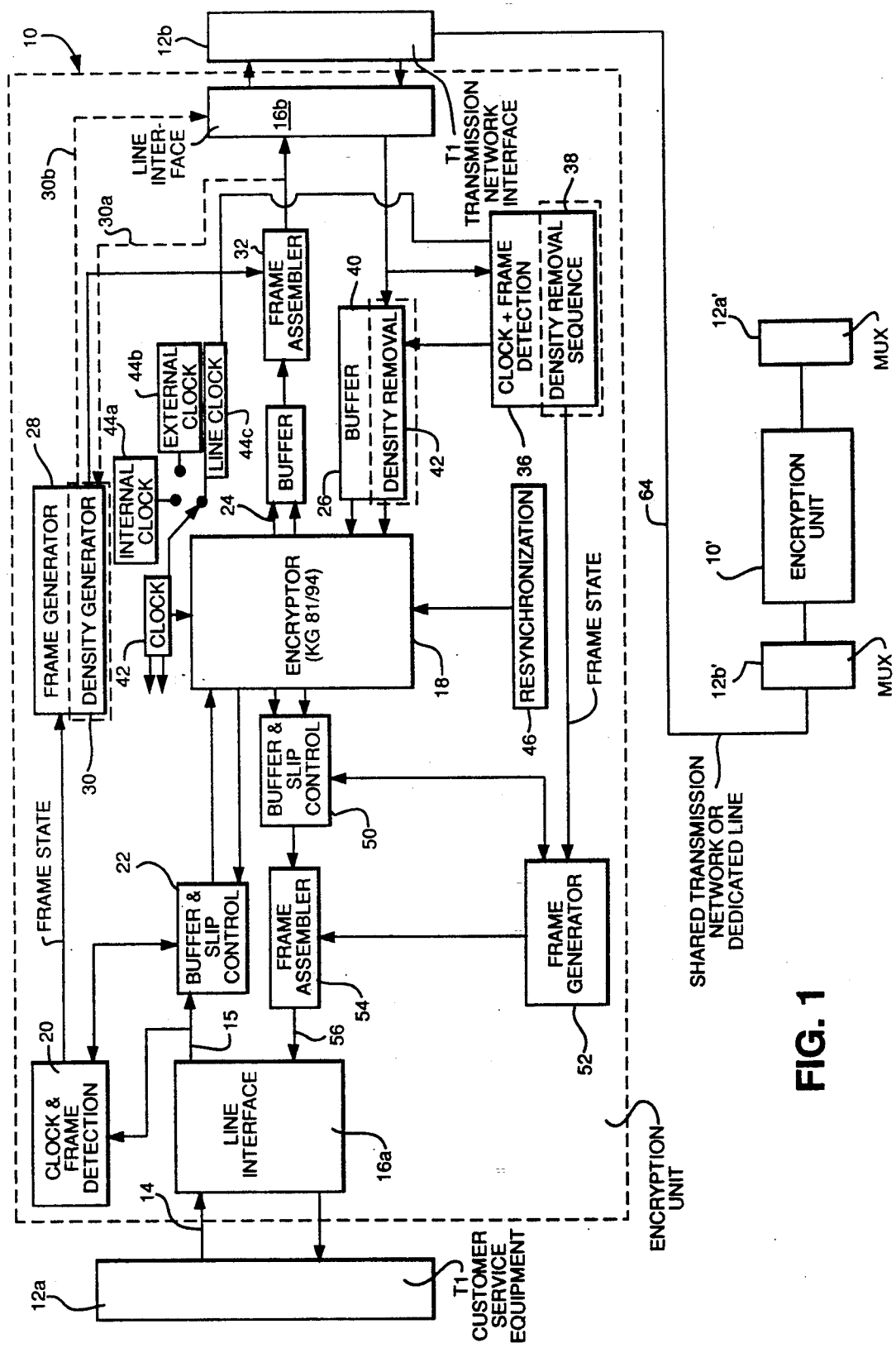
FIG. 1 is a block diagram of an encryption system incorporating a frame bit pass around scheme in accordance with a preferred embodiment of the invention.

Referring to FIG. 1, a communications arrangement incorporating a T1 encryption system constructed in accordance with a preferred embodiment of the invention is shown. The overall encryption system comprises a pair of identical encryption systems with each system comprising a local side and a remote side. Components of the local side of one system and the remote side of the other system are contained within a first unit 10. A second unit 10' is identical to the first unit 10 and the remote side of the one system is contained in unit 10' along with the local side of the other system. The units 10 and 10' of each encryption system cooperate with corresponding T1 multiplexers 12a and 12a', and T1 network interfaces 12b and 12b', respectively, which are provided for by the end user or by a common carrier such as AT&T, MCI, or US Sprint. The overall transmission network system shown in FIG. 1 is conventional and will not be further described.

Figure 2A:
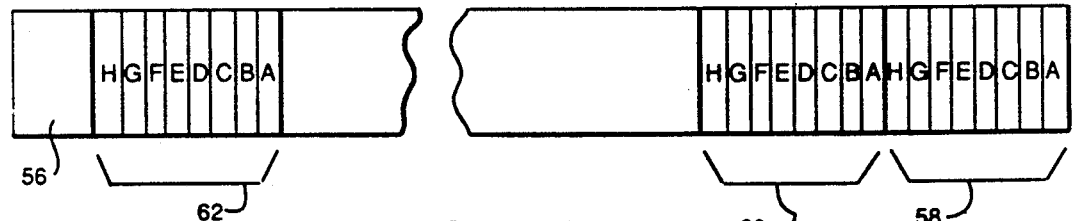
FIGS. 2(a) through 2(d) are schematic diagrams of the formats of various data streams created by the system of FIG. 1.

The T1 multiplexers 12a, 12' and T1 transmission network interfaces 12b, 12b' are respectively identical. Each multiplexer has an input of up to twenty-four individual signals and an outputs a single T1 bit stream on an output line that is a time division multiplex of the original twenty-four individual signals. The T1 transmission network interfaces 12b and 12b'may be an access port to a shared transmission network or to a dedicated transmission line. Considering multiplexer 12a connected between an output line 14 and an input of encryptor unit 10, FIG. 2(a) schematically represents the T1 bit stream on output line 14. As shown in FIG. 2(a), the bit stream on output line 14 is composed of a framing bit or frame bit 56 and twenty-four channels, three of which denoted 58, 60, and 62 are shown. Each of these channels has eight bits of data which are unencrypted and which are denoted A through H for the respective channels 58, 60, and 62.

Referring again to FIG. 1 and to unit 10, after multiplexing is performed by multiplexer 12a, the T1 bit stream on output line 14 is then sent to a line interface 16a which serves to adjust signal levels between the T1 multiplexer 12a and an encryptor 18. A clock and frame detector 20 samples the T1 bit stream on an output line 15 15 connected to the line interface 16a. In a preferred embodiment, the clock and frame detector 20 only detects the state of the frame bits 56 and not the actual bit values. In an alternative embodiment, the actual bit values of the frame bits 56 are detected by the clock and frame detector 20. The clock and frame detector 20 also detects the clocking of the T1 bit stream from line interface 16a. The frame state is the value of the frame bit 56 and the time location of the frame bit 56 in the bit stream. The frame state takes into account the time delay associated with the circuits comprising the T1 encryption system.

Between the encryptor 18 and the line interface 16 is a buffer 22. Buffer 22 provides the storage of the T1 bit stream from line interface 16 until the encryptor 18 is ready to encrypt the bit stream. When ready, encryptor 18 encrypts the bit stream stored by buffer 22, thus creating a encrypted bit stream on an output line 24.

The clocking source for the encryption unit 18 is provided for by a clock selector 42. Clock selector 42 chooses between an internal clock 44a, an external clock 44b, or a loop timing clock 44c. In the event that encryptor 18 looses synchronization, a resynchronization control circuit 46 is used to initiate resynchronization of the local encryptor 18 with a remote encryptor in encryption unit 10'. The encrypted bit stream on output line 24 is stored in a buffer 26 until the frame assembler 32 is ready to combine them with the frame bit from frame generator 28.

Figure 2B:
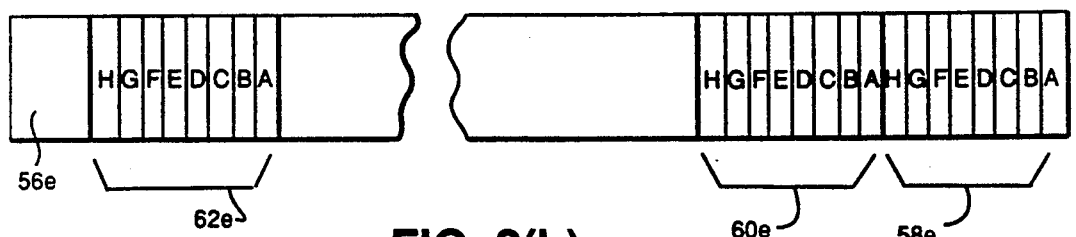

FIG. 2(b) schematically represents the T1 bit stream on output line 24. The bit stream on output line 24 is composed of an encrypted framing bit 56e and twenty-four encrypted channels, three of which, denoted 58e, 60e, and 62e are shown. Each of these channels has eight bits of encrypted data denoted A through H for each of the respective channels 58e, 60e, and 62e.

Referring again to FIG. 1, the clock and frame detector 20 next sends the frame state information to a frame generator 28, and, optionally, to a "ones" density generator 30. In a preferred embodiment, a frame bit pattern is generated which represents the frame state. In an alternative embodiment, the actual frame bit values would be used. A frame assembler 32 connected to frame generator 28 reinserts the frame bits in the appropriate locations in the encrypted bit stream stored in buffer 26, replacing encrypted frame bit 56e with a bit generated by frame generator 28. The bit stream as so modified appears on an output line 34. In this embodiment, the optional ones density generator 30 would then receive on a line 30a the output of the frame assembler 32 and correct for any sequence of bits appearing on line 34 having the value of zero for a predetermined number of consecutive bits by inserting a specific pattern of bits in the place of the consecutive zeros to avoid clocking problems in repeaters and other transmission facility devices. The resultant bit stream would then be applied to a line interface 16b which is described below.

Figure 2C:
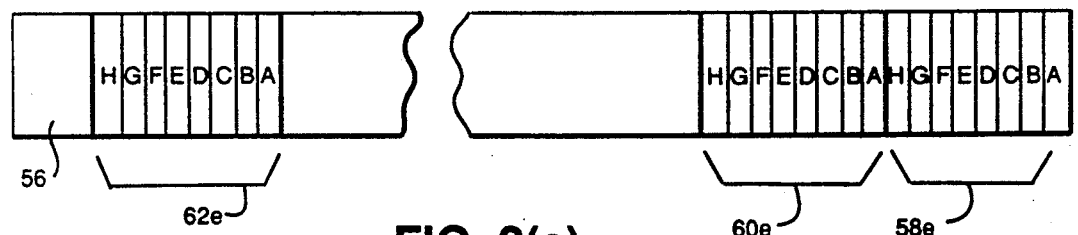

FIG. 2(c) schematically represents the T1 bit stream on output line 34. The bit stream on output line 34 is composed of an unencrypted framing bit 56 and twenty-four encrypted channels, three of which denoted 58e, 60e, and 62e are shown. Each of these channels has eight encrypted bits of data denoted A through H for each of the respective channels 58e, 60e, and 62e.

Referring again to FIG. 1, and considering the first embodiment discussed above, the bit stream from frame assembly 32 on output line 34 is sent to the interface 16b which was mentioned above and which provides connection to the T1 transmission network interface 12b. The T1 transmission network interface 12b is connected to either a dedicated T1 line 64 or a shared T1 transmission network (not shown). The T1 line 64 is connected to the T1 transmission network interface 12b' associated with encryption unit 10' at the remote site.

As discussed above, encryption units 10 and 10' are identical and for the simplicity of description and illustration, the receiving elements or components of the encryption system at the remote site which receive the signal transmitted over dedicated line 64 will be described relative to the receiving elements or components of the encryption unit 10 at the local site (which normally receive the signals transmitted by the T1 multiplexer 12a' of encryption unit 10'). Thus, using this convention, the bit stream on dedicated T1 line 64 is received by the T1 transmission network interface 12b and is then sent to the line interface 16b. A clock and frame detector 36 samples the bit stream from line interface 16b. An optional ones density remover 38 can also be provided in conjunction with the clock and frame detector 36. In the preferred embodiment referred to above, the clock and frame detector 36 only detects the state of frame bits 56 and not the actual bit values. In the alternative embodiment, the actual bit values of the bits are detected by clock and frame detector 36. Clock and frame detector 36 functions similarly to clock and frame detector 20 described above and in this alternative embodiment an optional ones density remover 38 is used to detect the particular pattern of bits inserted by the ones density generator 30. If the ones density remover 38 detects the particular pattern of bits, a correction is made in buffer 40 whereby consecutive zeros are inserted in the place of the pattern of bits previously created by the one density generator 30.

In the preferred embodiment, the bit stream from line interface 16b is stored in a buffer 40 until encryptor 18 is ready to decrypt the bit stream. In the alternative embodiment, the frame bit is, as noted previously, detected and stored along with the time location of the frame bit 56 in the bit stream and the time delay associated with the circuits comprising the T1 encryption system for later reinsertion. Encryptor 18 which, as explained above, is now the remote encryptor in this portion of the description, will have the associated clock selector or conditioning circuit 42 set to the appropriate setting for operation with the clock selector of the local encryptor. This may vary with the application involved after encryptor 18 decrypts the bit stream from buffer 40, the decrypted bits are stored in a further buffer 50.

Figure 2D:

FIG. 2(d) schematically represents the T1 bit stream produced by encryptor 18 and, as illustrated, this bit 5 stream is composed of a encrypted framing bit 56d and twenty-four decrypted channels, three of which denoted 58, 60, and 62 are shown. Each of these channels has eight bits of data denoted A through H for each of the respective channels 58, 60, and 62.

Referring back again to FIG. 1, a further frame generator 52 receives the frame state information from the frame detector 36. Frame generator 52 functions similarly to frame generator 28 described above. A frame assembler 54 receives the frame bit information from frame generator 52 and inserts the frame bit 56 into its respective location in the bit stream received from buffer 50. The frame assembler 54 sends the modified bit stream received from buffer 50 to line interface 16a via input line 56. The bit stream on input line 56 is similar to the bit stream on output line 15. Line interface 16 receives the bit stream from frame assembler 54 and sends the bit stream to the T1 multiplexer 12a wherein the bit stream is demultiplexed into its respective twenty-four channels.

It will be appreciated from the foregoing that by providing for a pass around of the TDM framing bit information the T1 network can be used to send encrypted information over further dedicated lines or shared T1 transmission networks, thus reducing the cost of connectivity and increasing throughput. As noted above, the end user is not affected by this encryption approach since the passing around of the TDM framing bit information will be transparent to the end user. Further, as explained previously, the system enables T1 lines to be used with classified or sensitive T1 groups communicating over leased facilities or commercial networks, provides a 64 Kbps clear channel capability and ISDN compatibility, and enables the separation of classified T1 groups passing through DCCs.

Although the present invention has been described to specific exemplary embodiments thereof, it will be understood by those skilled in the art that variations and modifications can be effected in these exemplary embodiments without departing from the scope and spirit of the invention.

What is claimed is:

1. An encryption system for interfacing with a time division multiplexing (TDM) telecommunications arrangement, said encryption system providing encryption of data received by said telecommunications arrangement and the telecommunications arrangement producing an in-band TDM data stream formatted into TEM frames including a predetermined number of individual in-band TDM framing bits located at corresponding individual original in-band framing bit locations, said encryption system including a local side comprising:

means for receiving from said telecommunications arrangement a first in-band TDM data stream to be encrypted;

means for removing each of said individual in-band TDM framing bits from the received in-band TDM data stream;

means for encrypting said received in-band TDM data stream after said framing bits are removed to produce an encrypted data stream; and means for reinserting each of said individual in-band TDM framing bits into a said corresponding individual original framing bit location in said encrypted TDM data stream to produce an encrypted data stream with reinserted in-band TDM framing bits; and said system further including a remote side comprising:

means for receiving said encrypted data stream with inserted in-band TDM framing bits, for removing said in-band TDM framing bits therefrom, and for decrypting the received encrypted data stream to produce a second TDM data stream; and means for reinserting said in-band TDM framing bits into said second TDM data stream at said corresponding original framing bit locations so as to produce a third in-band TDM data stream that corresponds to said first in-band TDM data stream.

2. The system recited in claim 1 further comprising means for detecting a predetermined number of consecutive zeros in said encrypted data stream with inserted TDM framing bits and means for inserting a predetermined pattern of bits into bit locations of said predetermined number of zeros.

3. The system recited in claim 2 further comprising means for detecting said predetermined pattern in said encrypted data stream with inserted TDM framing bits and means for inserting a predetermined number of consecutive zeros into bit locations of said predetermined pattern.

4. The system recited in claim 1 wherein said encrypting means further comprises a means for selecting a clocking signal.

5. The system recited in claim 4 wherein said clocking signal comprises an internal clock.

6. The system recited in claim 4 wherein said clocking signal comprises an external clock.

7. The system recited in claim 4 wherein said clocking signal comprises a loop timing clock.

8. In a time division multiplexing (TDM) telecommunications system which produces an in-band TDM data stream formatted into TDM frames including a predetermined number of individual in-band TDM framing bits located at corresponding individual original framing bit locations, an encryption system comprising first and second encryption units interconnected by a telecommunications network of said telecommunications system, said encryption units comprising:

means for receiving a first in-band TDM data stream to be encrypted;

means for removing each of said individual in-band TDM framing bits from the received in-band TDM data stream;

means for encrypting said received in-band TDM data stream after said framing bits have been detected and stored to produce an encrypted data stream; and means for inserting each of said individual in-band TDm framing bits into a said individual corresponding original framing bit location in said encrypted TDM data stream to produce an encrypted data stream with inserted in-band TDM framing bits for transmission to said second unit; and means for receiving an encrypted data stream with inserted in-band TDM framing bits from said second unit, for detecting and storing each of said individual in-band TDM framing bits therefrom, and for decrypting said encrypted data stream to produce a second TDM data stream; and means for reinserting each of said individual in-band TDM framing bits into said second TDM data stream at said corresponding original framing bit locations so as to produce a third in-band TDM data stream that corresponds to said first in-band TDM data stream encrypted by said second unit.

9. The system recited in claim 8 wherein said means for receiving a first TDM data stream comprises a multiplexer and a line interface connected to the output of said multiplexer.

10. The system recited in claim 8 wherein said means for detecting and storing said TDM framing bits comprises a clock and frame detection circuit connected to said means for receiving a first TDM data stream.

11. The system recited in claim 8 wherein said means for encrypting said received TDM data stream after said framing bits are detected and stored to produce an encrypted data stream comprises a buffer connected to said means for receiving a first TDM data stream and an encryptor connected to said buffer.

12. The system recited in claim 8 wherein said means for reinserting said TDM framing bits into said corresponding framing bit locations in said encrypted TDM data stream to produce an encrypted data stream with inserted TDM framing bits comprises a buffer means connected to the encrypting means for storing said encrypted TDM data stream, and a frame generator connected to said means for removing said TDM framing bits for generating frame bits, a frame assembler connected to said buffer means and to said frame generator for inserting said frame bits in said encrypted TDM data stream stored in said buffer means.

13. The system recited in claim 8 wherein said means for receiving said encrypted data stream with inserted TDM framing bits comprises a transmission network interface and a line interface connected to said multiplexer.

14. The system recited in claim 8 wherein said means for removing said TDM framing bits comprises a clock and frame detector connected to said means for receiving said encrypted data stream.

15. The system recited in claim 8 wherein said means for decrypting said encrypted data stream comprises a buffer connected to said means for receiving said encrypted data stream and an encryptor connected to said buffer.

16. The system recited in claim 8 wherein said means for inserting said TDM framing bits into said second TDM data stream at said corresponding framing bit locations comprises a buffer means connected to said decrypting means for storing said encrypted TDM data stream, a frame generator attached to said means for detecting and storing said TDM framing bits for generating frame bits, a frame assembler connected to said buffer means and to said frame generator for inserting said frame bits in said encrypted TDM data stream stored in said buffer means.

* * * * *